United States Patent [19]

Gaul

[11] 4,367,083
[45] Jan. 4, 1983

[54] NICKEL-BASE SPINNER ALLOY

[75] Inventor: David J. Gaul, Newark, Ohio

[73] Assignee: Owens-Corning Fiberglas Corporation, Toledo, Ohio

[21] Appl. No.: 318,728

[22] Filed: Nov. 6, 1981

[51] Int. Cl.³ .................... C03B 37/04; C22C 19/05
[52] U.S. Cl. ................................. 65/1; 65/374.12; 148/427; 420/442
[58] Field of Search ............... 75/171, 134 F; 148/32; 65/1, 374

[56] References Cited

U.S. PATENT DOCUMENTS

| 3,316,074 | 4/1967 | Laurent et al. | 75/171 X |
| 3,806,338 | 4/1974 | Ford | 75/171 |
| 4,203,748 | 5/1980 | Battigelli et al. | 75/171 X |

Primary Examiner—M. J. Andrews
Assistant Examiner—Alan E. Schiavelli
Attorney, Agent, or Firm—Ronald C. Hudgens; Patrick P. Pacella; Philip R. Cloutier

[57] ABSTRACT

A nickel-base alloy, particularly suitable for high temperature molten glass environments, and articles manufactured from the alloy, preferably by casting, are disclosed.

10 Claims, 2 Drawing Figures

NICKEL-BASE SPINNER ALLOY

This invention relates to an improved spinner alloy.

In one of its more specific aspects, this invention relates to an alloy particularly suitable for high temperature glas fiber production.

BACKGROUND OF THE INVENTION

In the glass fiber producing industry, there is a need for alloys which possess high rupture strength, high oxidation resistance at high temperatures and resistance to attack by molten glass. In this industry, glass filaments are produced by passing molten glass through the foraminous walls of a spinner adapted for rotation at high speeds, the filaments being emitted through the apertures of the wall due to the certrifugal action to which the molten glass is subjected.

Such spinners are usually operated at temperatures of about 2050° F. and rotational speeds of about 1700 RPM. Under these conditions, the alloy of this invention has been found to possess superior stress—rupture and creep properties and superior resistance to the corrosion by the molten glass.

STATEMENT OF THE INVENTION

Accordingly to this invention there is provided a composition of metal consisting essentially of the following approximate composition, the various components of this composition being expressed on a weight percent basis:

| Element | Approximate Composition, Wgt. % |
|---|---|
| Chromium | About 11.75 to about 13 |
| Wolfram | About 9 to about 11 |
| Cobalt | About 9 to about 11 |
| Tantalum | About 5 to about 6.8 |
| Carbon | About 0.5 to about 0.7 |
| Silicon | About 0.5 to about 0.7 |
| Nickel | balance |

In the best mode, the composition of this invention will consist essentially of the following, on a weight percent basis:

| Element | Approximate Composition, Wgt. % |
|---|---|
| Chromium | About 12.5 |
| Wolfram | About 10.0 |
| Cobalt | About 10.0 |
| Tantalum | About 6.0 |
| Carbon | About 0.6 |
| Silicon | About 0.6 |
| Nickel | balance |

The above compositions are not meant to exclude the presence of impurities which are inherently contained in the master alloys employed to form the composition. However, the impurities should be limited to less than about 1 weight percent iron and less than about 0.015 weight precent sulfur.

BRIEF DESCRIPTION OF THE INVENTION

Figure 1:
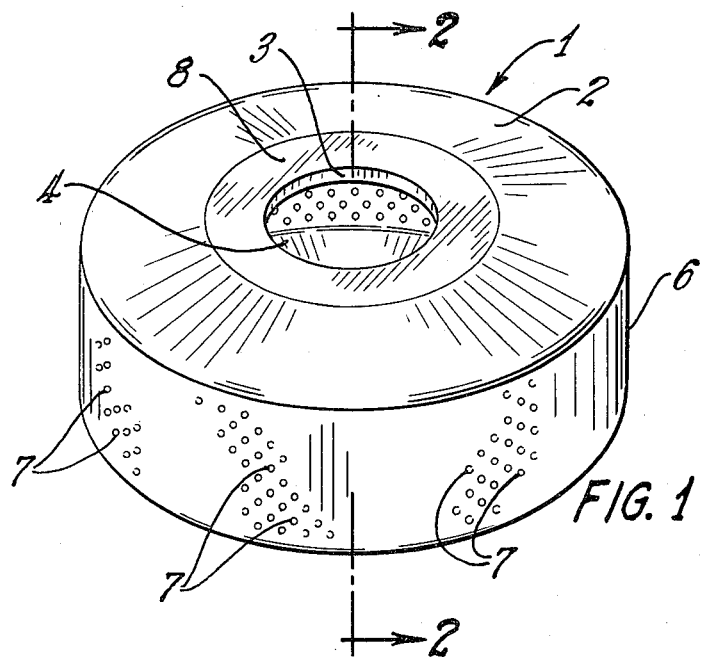
FIG. 1 is a perspective view of a spinner.
Figure 2:
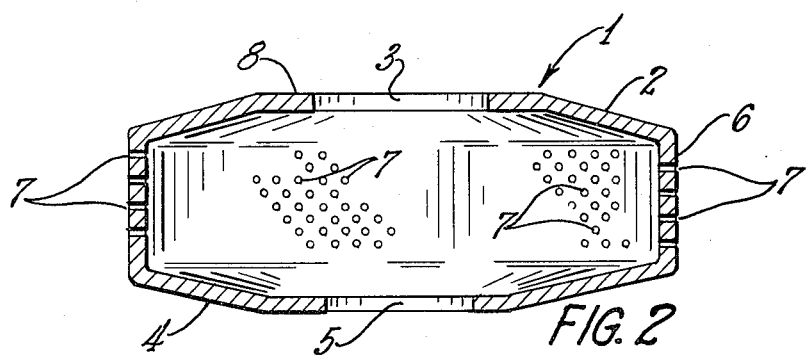
FIG. 2 is a sectional view of the spinner of FIG. 1 through section 2—2 of FIG. 1.

The compositions of this invention can be prepared by air melting under argon and air casting into sand shell molds according to recognized melt procedures for nickel-base alloys. Preferably, the melt components are used in the form of masster alloys to facilitate the melting of the high melting point elements of the composition.

In the preferrred method of producing the alloy, nickel, cobalt, carbon and silicon are included in the initial melt. When this melt is at about 2600° F., the chromium is plunged in. The wolfram is then added. The tantalum is added at a mix temperature of about 2800° F. in the form of a 40 nickel, 60 tantalum composite (weight percent) on the basis that some excess tantalum is included inasmuch as about 0.8 weight percent of the tantalum introduced into the mixture will be lost.

The composite mixture is then brought to a pour temperature of about 2900° F. at which point a nickel/magnesium deoxidizer is added to prevent tantalum loss.

The mixture is poured into sand molds at about 2900° F. and the pourings are allowed to air cool.

The alloy can be heat treated by annealing for about 4 hours at about 2000° F. and air cooling to room temperature.

The alloy of this invention will have a steady state creep rate at 2100° F. and 3000 psi of about $2 \times 10^{-4}$ in./in./hr.

The rupture property of this alloy of this invention will depend, in part, upon the method of degasing employed and will have a value from about 40 to about 96 hours. Various methods have been employed and the rupture lives at 2100° F. and 3000 psi. were as follows:

| Method of Degasing | Rupture life, Hrs. |
|---|---|
| C boil & Mg | 85.4 |
| Mg | 95.5 |
| Al plunged in foil | 88.5 |
| Al | 40 |

The alloy of this invention can be employed to produce other high temperature resistant articles.

One of the many types of cast spinners which can be fabricated employing the alloy of this invention is illustrated in the attached drawings.

Referring now to these figures, in which like numerals represent like parts, there is shown spinner 1 fabricated in its entirety of the alloy of this invention.

Spinner 1 is comprised of an upper wall 2 having opening 3 therein and lower wall 4 having opening 5 therein. Continuous side wall 6 extends between upper wall 2 and lower wall 4 to form a substantially circular chamber. Side wall 6 is adapted with apertures 7 which penetrate the side wall and through which molten glass, introduced into the spinner through opening 3, is discharged.

As may apply in some spinner types, opening 3 can be adapted with flange 8 for connection to means, not shown, for rotating the spinner. The spinner can also be adapted with opening 5 for the extension therethrough of fluid introductory means, not shown.

It will be evident from the foregoing that various modifications can be made to this invention. Such, however, are within the scope of the invention.

I claim:

1. A composition of matter consisting essentially of the following elements in amounts expressed in weight percent:
   Chromium—from about 11.75 to about 13
   Wolfram—from about 9 to about 11
   Cobalt—from about 9 to about 11
   Tantalum—from about 5 to about 6.8
   Carbon—from about 0.5 to about 0.7
   Silicon—from about 0.5 to about 0.7
   Nickel—balance 2. The composition of claim 1 in which said elements are contained in the following approximate amounts, expressed in weight percent.
   Chromium—about 12.5
   Wolfram—about 10.0
   Cobalt—about 10.0
   Tantalum—about 6.0
   Carbon—about 0.6
   Silicon—about 0.6
   Nickel—balance 3. The composition of claim 1 in which said composition contains less than about 1 weight percent iron and less than about 0.015 weight percent sulfur.

4. The composition of claim 1 which is castable in air at about 2900° F.

5. The composition of claim 1 having a steady state creep rate at 2100° F. and 3000 psi of about $2 \times 10^{-4}$ in./in./hr.

6. The composition of claim 1 having a rupture life within the range of from about 40 to about 96 hours.

7. The composition of claim 1 which is poured at about 2900° F. and heat treated by annealing for about four hours at about 2000° F.

8. An article of manufacture produced by casting the composition of matter defined in claim 1.

9. An article of manufacture produced by casting the composition of matter defined in claim 2.

10. A spinner comprised of the composition of claim 1, said spinner having foraminous walls and being adapted for rotation.

* * * * *